(12) United States Patent
Huber et al.

(10) Patent No.: US 11,702,124 B2
(45) Date of Patent: *Jul. 18, 2023

(54) ADJUSTMENT DRIVE FOR A STEERING COLUMN, MOTOR-ADJUSTABLE STEERING COLUMN FOR A MOTOR VEHICLE, AND METHOD FOR ADJUSTING A BEARING ASSEMBLY OF AN ADJUSTMENT DRIVE

(71) Applicants: thyssenkrupp Presta AG, Eschen (LI); thyssenkrupp AG, Essen (DE)

(72) Inventors: Sebastian Huber, Göfis (AT); Arne Schacht, Feldkirch (AT); Jean-Pierre Specht, Haag (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 200 days.

This patent is subject to a terminal disclaimer.

(21) Appl. No.: 17/257,888

(22) PCT Filed: Jul. 9, 2019

(86) PCT No.: PCT/EP2019/068368
§ 371 (c)(1),
(2) Date: Jan. 5, 2021

(87) PCT Pub. No.: WO2020/011771
PCT Pub. Date: Jan. 16, 2020

(65) Prior Publication Data
US 2021/0269081 A1 Sep. 2, 2021

(30) Foreign Application Priority Data

Jul. 11, 2018 (DE) .................... 10 2018 211 493.5
Jul. 11, 2018 (DE) .................... 20 2018 104 386.2

(51) Int. Cl.
*B62D 1/181* (2006.01)
*F16C 25/08* (2006.01)
(Continued)

(52) U.S. Cl.
CPC ............ *B62D 1/181* (2013.01); *F16C 25/083* (2013.01); *F16C 33/588* (2013.01);
(Continued)

(58) Field of Classification Search
CPC ........ B62D 1/181; F16C 25/083; F16C 25/20; F16C 33/588; F16C 2326/01; F16H 2025/2084
See application file for complete search history.

(56) References Cited

U.S. PATENT DOCUMENTS

| | | | |
|---|---|---|---|
| 4,611,935 A * | 9/1986 | Rode | F16H 57/021 384/563 |
| 4,900,059 A | 2/1990 | Kinoshita | |
| 4,967,618 A | 11/1990 | Matsumoto | |
| 9,421,994 B2 | 8/2016 | Agbor | |
| 10,654,509 B2 * | 5/2020 | Huber | B62D 1/185 |

(Continued)

FOREIGN PATENT DOCUMENTS

| | | |
|---|---|---|
| CN | 106458243 A | 2/2017 |
| CN | 107406095 A | 11/2017 |

(Continued)

OTHER PUBLICATIONS

English Translation of International Search Report issued in PCT/EP2019/068368, dated Nov. 21, 2019.

*Primary Examiner* — Daniel D Yabut
(74) *Attorney, Agent, or Firm* — thyssenkrupp North America, LLC

(57) ABSTRACT

A motor adjustment drive for a vehicle steering column includes a threaded spindle with an axis. The threaded spindle engages a spindle nut. A drive unit and a gear wheel (Continued)

which is connected to the spindle nut or the threaded spindle for rotation therewith is driveable to rotate by the drive unit and is rotatably mounted in a bearing housing between two outer bearing rings that are axially supported at the bearing housing. The outer bearing rings each have, on their sides facing one another, a circumferential outer bearing face that is coaxial to the axis. Each outer bearing face lays opposite a bearing face embodied on the end side at the gear wheel. An outer bearing ring is axially resiliently supported at the bearing housing via an elastic element, which exerts an axial force that biases the two outer bearing rings toward each other.

5 Claims, 6 Drawing Sheets

(51) Int. Cl.
  *F16C 33/58* (2006.01)
  *F16H 25/20* (2006.01)
(52) U.S. Cl.
  CPC .......... *F16C 2326/01* (2013.01); *F16H 25/20* (2013.01); *F16H 2025/2084* (2013.01)

(56) References Cited

U.S. PATENT DOCUMENTS

| | | |
|---|---|---|
| 2007/0102228 A1 | 5/2007 | Shiina et al. |
| 2012/0048640 A1 | 3/2012 | Hamakita |
| 2013/0016059 A1 | 1/2013 | Lowles |
| 2013/0160597 A1 | 6/2013 | Masuda et al. |
| 2017/0097071 A1 | 4/2017 | Galehr |
| 2018/0003290 A1 | 1/2018 | Figura et al. |
| 2018/0015944 A1 | 1/2018 | Knoll et al. |
| 2019/0031539 A1 | 1/2019 | Naito |
| 2019/0315391 A1 | 10/2019 | Illes et al. |

FOREIGN PATENT DOCUMENTS

| | | |
|---|---|---|
| CN | 107542856 A | 1/2018 |
| DE | 3886900 T | 4/1994 |
| DE | 10 2014 200 479 A1 | 7/2015 |
| DE | 10 2014 104 362 A | 10/2015 |
| DE | 10 2017 201 379 A | 8/2018 |
| EP | 2 857 282 A | 4/2015 |
| WO | 2010/094318 A | 8/2010 |
| WO | 2015/144527 A | 10/2015 |

* cited by examiner

ADJUSTMENT DRIVE FOR A STEERING COLUMN, MOTOR-ADJUSTABLE STEERING COLUMN FOR A MOTOR VEHICLE, AND METHOD FOR ADJUSTING A BEARING ASSEMBLY OF AN ADJUSTMENT DRIVE

CROSS REFERENCE TO RELATED APPLICATIONS

This application is a U.S. National Stage Entry of International Patent Application Serial Number PCT/EP2019/068368, filed Jul. 9, 2019, which claims priority to German Patent Application No. DE 10 2018 211 493.5, filed Jul. 11, 2018 and German Patent Application No. DE 20 2018 104 386.2, filed Jul. 11, 2018, the entire contents of both of which are incorporated herein by reference.

FIELD

The present disclosure generally relates to an adjustment drive for a steering column that is adjustable by motor for a motor vehicle.

BACKGROUND

Steering columns for motor vehicles have a steering shaft with a steering spindle, at the rear end of which in the direction of travel, which faces the driver, a steering wheel is attached for introducing a steering command by the driver. The steering spindle is mounted in a manner rotatable about its longitudinal axis in an actuating unit, which is held at the vehicle body by a carrying unit. There can be a longitudinal adjustment on account of the fact that the actuating unit is received in a casing unit connected to the carrying unit, which is also referred to as guide box or box-section swinging fork, in a telescopically displaceable manner in the direction of the longitudinal axis. A height adjustment can be realized by virtue of the actuating unit or a casing unit receiving the latter being pivotably mounted at the carrying unit. Adjusting the actuator unit in the longitudinal or height direction allows an ergonomically comfortable steering wheel position to be set relative to the driver position in an operating position, also referred to as a drive or actuating position, in which there can be a manual steering intervention.

For the purposes of adjusting the actuating unit relative to the carrying unit, the prior art has disclosed the provision of a motor-driven adjustment drive with a drive unit that comprises an electrical servomotor which is connected to a spindle drive—as a rule, via a transmission—that comprises a threaded spindle screwed into a spindle nut. By way of the drive unit, the threaded spindle and the spindle nut are driveable to rotate against one another about an axis, namely the threaded spindle axis, as a result of which the threaded spindle and the spindle nut can be moved in translational fashion to one another or away from one another, depending on the direction of rotation. In one embodiment, the threaded spindle is driveable to rotate about its threaded spindle axis by the drive unit which is fixedly connected to the actuating unit or the carrying unit and engages in the spindle nut which is fixedly attached in relation to a rotation about the threaded spindle axis at the carrying unit or, alternatively, at the actuating unit. In the direction of the threaded spindle axis, the threaded spindle is supported at the carrying unit or at the actuating unit and the spindle nut is accordingly supported at the actuating unit or, alternatively, at the carrying unit such that a rotational drive of the threaded spindle brings about a translational adjustment of carrying unit and actuating unit relative to one another in the direction of the threaded spindle axis. Therefore, this embodiment is also referred to as a rotational spindle drive.

In an alternative embodiment, the threaded spindle is coupled to the carrying unit or, alternatively, to the actuating unit in a non-rotational manner with respect to rotation about its threaded spindle axis and the spindle nut is rotationally mounted accordingly at the actuating unit or, alternatively, at the carrying unit but it is stationary in the direction of the threaded spindle axis. Like in the first embodiment, the threaded spindle is supported at the carrying unit or at the actuating unit in the direction of the threaded spindle axis and the spindle nut is accordingly supported at the actuating unit or at the carrying unit such that the threaded spindle is displaceable in a translational manner in the direction of the threaded spindle axis by virtue of the spindle nut being driven to rotate by the drive unit. This embodiment is also referred to as a plunger spindle drive.

Like in the first-mentioned embodiment, a translational adjustment of carrying unit and actuating unit relative to one another is brought about in the direction of the threaded spindle axis as a result of the rotational drive of the threaded spindle. In both embodiments, the spindle drive forms a motor-driven adjustment drive that is effective between a carrying unit and an actuating unit, said adjustment drive facilitating the adjustment of the actuating unit relative to the carrying unit for adjustment purposes.

In order to realize a longitudinal adjustment of the actuating unit in the direction of the longitudinal axis of the steering spindle, the spindle drive of an adjustment drive can be arranged between the actuating unit and a casing unit that receives the latter in an axially longitudinally displaceable manner, said casing unit also being referred to as a guide box or box-section swinging fork and being connected to the carrying unit, wherein the threaded spindle axis can be aligned substantially parallel to the longitudinal axis. For the purposes of a height adjustment, a spindle drive can be arranged between the carrying unit and an actuating unit that is mounted thereon so as to be pivotable in height or a casing unit, in which the actuating unit is received. A motor-driven longitudinal and height adjustment can be embodied at a steering column individually or in combination.

The drive of the spindle drive is effected by the drive unit by way of a gear wheel that is driveable to rotate about its axis, which is identical to the threaded spindle axis, said gear wheel being connected to the spindle nut or to the threaded spindle for rotation therewith, depending on the embodiment of the spindle drive. The gear wheel has a toothed portion in the form of a spur gear, with an outer circumferential toothing or worm toothing.

The gear wheel in each case has a circumferential bearing face that is coaxial with the axis on each of its two end sides. In a bearing arrangement, the bearing faces are arranged between two corresponding outer bearing faces that are arranged on the sides of the two outer bearing rings facing one another, between which the gear wheel is rotatably mounted. As seen from the gear wheel, the outer bearing rings are supported and affixed on the outside at the bearing housing in the axial direction. As a result, holding and adjustment forces that act on the gear wheel in both axial directions of the threaded spindle axis on the spindle drive are transmitted via the gear wheel and the outer bearing rings onto the bearing housing, and are supported from there at the actuating unit or the carrying unit.

Such an adjustment drive with a rotatably mounted and axially supported gear wheel is known from U.S. Pat. No. 4,967,618, for example. The bearing faces of the gear wheel have raceways for rolling bodies, specifically ball-bearing raceways of ball bearings. Ball bearings as rolling bodies are arranged between these ball-bearing raceways and these opposing, corresponding ball-bearing raceways in the axially or obliquely opposing outer bearing faces of the outer bearing rings. As a result, a bearing arrangement is formed, in which the gear wheel is mounted between two axial pressure bearings in a manner supported in the axial direction, said pressure bearings in each case being formed by a bearing face, an outer bearing face and the ball bearings arranged therebetween. The outer bearing rings are rigidly affixed to the bearing housing.

During the assembly, a bearing arrangement is set by axially positioning and affixing the outer bearing rings relative to one another such that the ball bearings roll without play between the ball-bearing raceways. So that, where possible, no bearing play occurs during operation in order to ensure low-noise running, the outer bearing rings are braced against one another in the bearing housing such that the bearing faces and outer bearing faces are pressed against one another in the axial direction. Here, on the one hand, the axial setting force exerted on the outer bearing rings must be high enough so that play-free running of the ball bearings is ensured, even under temperature variations and in the case of wear. However, on the other hand, the setting force must not be too high, as this could result in an elevated breakaway torque of the gear wheel and increased wear.

Thus, a need exists for an improved adjustment drive and a steering column with an improved adjustment drive, which has greater running smoothness and less wear.

DETAILED DESCRIPTION

Figure 1:
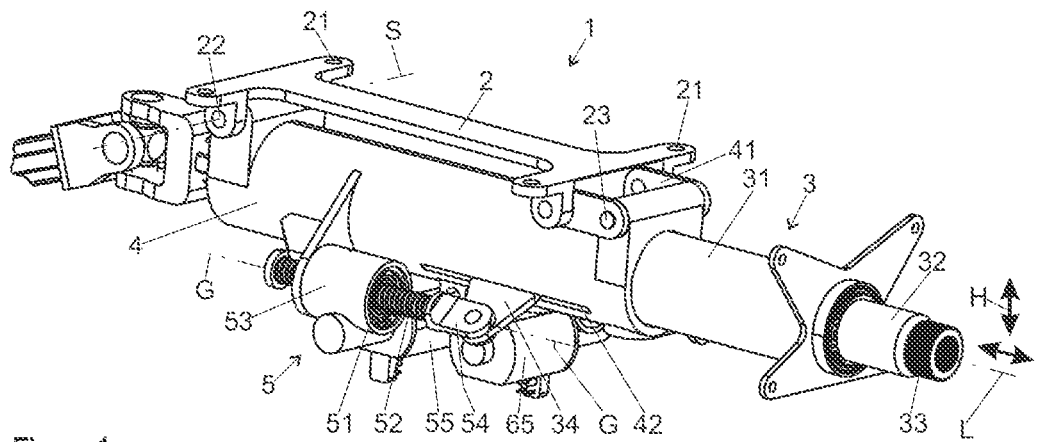
FIG. 1 is a schematic perspective view of a steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to an adjustment drive for a steering column that is adjustable by motor for a motor vehicle, comprising a threaded spindle with an axis, said threaded spindle engaging in a spindle nut, a drive unit and a gear wheel which is connected to the spindle nut or the threaded spindle for rotation therewith, which is driveable to rotate about the axis by a drive unit and which is rotatably mounted about the axis in a bearing housing in a bearing arrangement between two outer bearing rings that are axially supported at the bearing housing, wherein the outer bearing rings each have, on their sides facing one another, a circumferential outer bearing face that is coaxial to the axis, said outer bearing face in each case lying opposite a bearing face embodied on the end side at the gear wheel. Furthermore, the invention relates to a steering column that is adjustable by motor for a motor vehicle, with such an adjustment drive and a method for setting a bearing arrangement of an adjustment drive.

In order to achieve the aforementioned object, an adjustment drive for a steering column that is adjustable by motor for a motor vehicle having the features specified at the outset is proposed, in which, according to the invention, at least one outer bearing ring is supported in an axially resilient manner at the bearing housing by way of an elastic preloading element, which exerts a preloading force that axially braces the two outer bearing rings against one another.

Unlike in the prior art, the two outer bearing rings are according to the invention not rigidly supported at the bearing housing but are elastically clamped in the axis direction. The axis direction corresponds to the direction of the longitudinal axis. The at least one preloading element is formed by an axially effective spring element, which on its side that faces away from the bearing arrangement, i.e., from the outer bearing rings, to the outside is supported axially at the bearing housing, and which on its other side acts axially on the corresponding outer bearing ring. In the assembled operational state, the preloading element is preloaded or compressed so far in the axial direction, i.e., in the direction of the longitudinal axis, that it exerts a predetermined preloading force on the outer bearing ring and said preloading element is affixed in this preloading or assembly position relative to the bearing housing. The preloading element, which is axially loaded in this way, presses the outer bearing ring against the gear wheel with the elastic force, i.e., the spring force, as a result of which said gear wheel is also pressed against the other outer bearing ring with the preloading force. Consequently, the bearing arrangement is elastically preloaded in the axis direction by way of the preloading element.

An advantage of the invention is that the preloading force, which can be set during the assembly by compressing the preloading element, ensures a more uniform axial pressure between the bearing faces and the corresponding outer bearing faces over the entire service life of the adjustment drive, even under inexpedient operating conditions, for example thermal load or wear, as result of which an unwanted and damaging bearing play is suppressed. In a rolling-element bearing arrangement, the rolling bodies roll without play and, in an alternative plain bearing arrangement, an optimized sliding contact is ensured. This increases the running smoothness and reduces wear.

It is possible that the preloading element exerts the preloading force on the one of the two outer bearing rings, and the other outer bearing ring is supported in an axially rigid manner at the bearing housing at a counter bearing. As a result thereof, the preloading force is axially coupled, in the preloading direction, into the bearing arrangement that is stationary relative to the bearing housing. Alternatively, the provision of two preloading elements, which, from both sides, respectively act on the outer bearing rings, is possible. As a result thereof, the bearing arrangement is likewise elastically preloaded and, moreover, elastically held in both axis directions relative to the bearing housing. As a result, it is possible to elastically absorb and dampen torque peaks.

The preloading element can comprise a ring-shaped spring element. The spring element can be elastically compressed axially by the preloading force and it permanently transfers said preloading force onto the bearing arrangement as the spring force. The ring-shaped embodiment that is coaxial with the axis corresponds to the dimensions of the outer ring, against which the spring element lies directly or indirectly in the assembled state. The spring travel in the axial direction can be adapted to the deviations, expected during operation, as a result of wear and temperature variations, and so these deviations that occur during the service life are effectively compensated thanks to the solution according to the invention. By way of example, the spring element can comprise a spring ring or wave ring, a coil spring, disk spring or leaf spring or the like, preferably made of spring steel, or alternatively, or else in combination, an elastomeric ring, rubber ring or O-ring that is likewise elastically deformable in the axial direction or a cord ring formed from an elastomer. Different constructions of spring elements can be combined for the purposes of optimized spring and damping properties, for example a spring ring and an O-ring at one or both outer bearing rings.

The preloading element can comprise a securing element. This securing element can be elastically compressed in the axial direction by the preloading force and it permanently transfers said preloading force onto the bearing arrangement as the spring force. The securing element furthermore serves as a holding or supporting element, which is secured at the bearing housing in the axial direction, for example by way of an interlocking, force-fit and/or substance-to-substance connection. The connection can have a detachable embodiment, for example by way of a clamped, latched or screwed connection, or else it can be non-detachable, for example as a result of welding.

Preferably, the preloading element is embodied as an integral securing element.

The securing element is preferably embodied as an integral sheet metal shaped part, preferably as a one-piece integral component. Preferably, the securing element is embodied in integral fashion as a spring element, wherein an intermediate element as a damping element is arranged between the spring element and the outer ring. By way of example, this intermediate element can be embodied as an elastomeric element, such as an O-ring, for example. Alternatively, the intermediate element can be applied to the securing element, for example by way of a cured-on elastomeric element.

In a preferred embodiment, provision can be made for the preloading element to be supported at a securing element that is connected to the bearing housing. The securing element serves as a holding or supporting element, which is secured at the bearing housing in the axial direction, for example by way of an interlocking, force-fit and/or substance-to-substance connection. The connection can have a detachable embodiment, for example by way of a clamped, screwed or latched connection, or else it can be non-detachable, for example as a result of welding. A preloading element according to the invention can be elastically clamped between the securing element and an outer bearing ring. Likewise, it is possible that one of the outer bearing rings is supported at the bearing housing via a securing element without an interposed preloading element, said bearing housing then forming a rigid counter bearing.

In terms of form and dimensions, the preloading element can be matched to an outer bearing ring and a securing element, which may be embodied as a ring-shaped or segment-shaped securing ring, for example. It is possible to provide a securing element on an end side of a bearing arrangement which, on its other side, is supported against a counter bearing that is connected to, or formed at, the bearing housing. Likewise, it is possible that the bearing arrangement is secured between two securing elements at the bearing housing such that the preloading force that is produced by the preloading element is introduced into the bearing housing via the securing elements.

In a development, provision can be made for the preloading element to be formed, at least in part, by the securing element. This can be achieved by virtue of the securing element per se having an elastic embodiment in the axial direction. As a result, it receives a dual function, specifically, firstly, that of providing the support and hold at the bearing housing and, secondly, that of producing the elastic preloading force. By way of example, the securing element can be embodied as a securing ring, made of spring steel, for example, which has a fastening means, for instance holding rims or holding edges engaging in an interlocking fashion, at its circumference. Away from the fastening means, axially effective spring elements can be provided at the securing ring, for example a conical portion of a disk spring, a wavy portion of a wave spring, resilient logs or the like. The spring elements can be supported directly or indirectly at an outer bearing ring from the outside.

Rolling bodies can be arranged between the gear wheel and the outer bearing rings. Here, the gear wheel in each case forms an angular-contact rolling-element bearing together with an outer bearing ring and the rolling bodies arranged therebetween. Both an X-arrangement and an O-arrangement of the angular-contact rolling-element bearing can be provided. Alternatively, an axial rolling-element bearing may also be provided. Alternatively, it is also conceivable and possible for an outer bearing face and a corresponding bearing face to have sliding faces that slide on one another for the purposes of forming an angular-contact plain bearing.

One of the two outer bearing rings can be supported at the bearing housing at a counter bearing in an axially rigid manner. As a result, the bearing arrangement that is elastically loaded via the other outer bearing ring by the preloading element is supported in stationary fashion at the bearing housing. The counter bearing can be fixedly embodied on the bearing housing, or else it can be formed by a securing element that is fastened to the bearing housing. The counter bearing can be preferably embodied as a shoulder, wherein this shoulder is preferably embodied by a shaping operation, for example by circumferential rolling, wherein a bead formed on the outer lateral face forms a shoulder on the inner lateral face. Alternatively, projections distributed over the circumference can also form such a shoulder. By way of example, these projections can be introduced into the bearing housing from the outside by way of local plastic deformations.

An advantageous embodiment of the invention provides for the bearing housing to comprise a hollow cylindrical receiving space, in which the outer bearing rings and the gear wheel are arranged coaxially in relation to the axis. The receiving space forms a passage with a circular inner cross section, in which the bearing arrangement, formed by the gear wheel and the outer bearing rings, is received in a coaxial fashion. Preferably, the securing element or elements likewise can be embodied in the ring-shaped manner as securing rings, which are arranged and affixed in coaxial fashion in the receiving space.

A development provides for the securing element to comprise fastening means for affixment inside the receiving space. As a result of the securing element being fastened to the inner wall in force-fit and/or interlocking fashion, the entire bearing arrangement, including the axial support, can be arranged in the bearing housing, resulting in a compact and protected structure being realizable. In an advantageous embodiment, the securing element is embodied as a securing ring with an outer cross section that corresponds to the inner cross section of the receiving space of the bearing housing. Fastening means for connection with the inner wall of the receiving space can be arranged or formed at the outer circumference of the preferably round securing ring. By way of example, the fastening means can comprise holding structures on the outer circumference of the securing ring, for example blade-shaped, sharp-edged edges or blades which can be introduced or pressed into the inner wall in an interlocking manner and which secure the securing ring against axial movements in order to axially affix a preloading element or an outer bearing ring in the demanded preloaded position in the bearing housing.

Here, provision can be made for the fastening means to be embodied in a self-affixing manner. By way of example, this can be achieved by holding structures with the barb-like embodiment, which slide along the inner wall of the receiving space when the securing element is introduced axially into the passage of the bearing housing in the preloading direction during the assembly and pressed with the preloading force against the preloading element. In the operational state after the assembly, the securing element is axially loaded by the preloading force against the preloading direction, as a result of which the barb-like holding structures of the fastening means are radially spread apart and independently cling on the inner wall, as a result of which the securing ring is axially affixed relative to the bearing housing. By way of example, a cutting edge that is inclined relative to the axis can be provided as a self-affixing fastening means, said cutting edge being embodied or arranged at least in portions at the outer circumference of the securing ring. For assembly purposes, this facilitates the simple axial insertion in the preloading direction into the receiving space against the preloading element. After the assembly, the cutting edge is plastically buried into the inner wall radially by the preloading force acting counter to the insertion direction and, as a result, it is affixed in the axial direction in interlocking fashion. Such self-affixing holding means with barb-like holding structures are realizable with little outlay, facilitate a simple assembly and facilitate secure hold.

The invention further comprises a steering column that is adjustable by motor for a motor vehicle which comprises an adjustment drive with the features described above, comprising a carrying unit, which is attachable to a vehicle body, and which holds an actuating unit, in which a steering spindle is rotatably mounted about a longitudinal axis, and comprising an adjustment drive, which is connected to the carrying unit and to the actuating unit, and by means of which the actuating unit is adjustable relative to the carrying unit, wherein the adjustment drive comprises a threaded spindle with an axis, said threaded spindle engaging in a spindle nut, a drive unit and a gear wheel which is connected to the spindle nut or the threaded spindle for rotation therewith, which is driveable to rotate about the axis by the drive unit and which is rotatably mounted about the axis in a bearing housing in a bearing arrangement between two outer bearing rings that are axially supported at the bearing housing, wherein the outer bearing rings each have, on their sides facing one another, a circumferential outer bearing face that is coaxial to the axis, said outer bearing face in each case lying opposite a bearing face embodied on the end side at the gear wheel.

As a result, it is possible to achieve an improved running smoothness of the adjustment drive under all occurring operating conditions of a steering column, which is of particular importance for the acceptance by the driver. Furthermore, the wear, and hence the servicing outlay, is advantageously reduced.

A method according to the invention for setting a bearing arrangement of an adjustment drive for a steering column that is adjustable by motor for a motor vehicle, comprising a threaded spindle with an axis, said threaded spindle engaging in a spindle nut, and a gear wheel which is connected to the spindle nut or the threaded spindle for rotation therewith and which is rotatably mounted about the axis in a bearing housing in a bearing arrangement between two outer bearing rings that are axially supported at the bearing housing, wherein an outer bearing ring is supported in an axially resilient manner at the bearing housing by way of an elastic preloading element, comprises the steps of:

A) applying an axial preloading force to the preloading element,

B) applying a load moment to the gear wheel and measuring the load moment,

C) measuring a bearing state variable (load moment itself or else: displacement of the gear wheel) that is correlated with the load moment, D) comparing the measured bearing state variable with a predetermined state target value, E) should the measured bearing state variable deviate from the state target value (within predetermined tolerance ranges): modifying the axial preloading force, E) should the measured bearing state variable attain the state target value (within predetermined tolerance ranges): affixing the preloading element (9) in an axial preloading position at the bearing housing and completing the setting process.

The method according to the invention facilitates optimized setting of a bearing arrangement having the above-described features, which comprises a preloading element according to the invention. Here, at least one bearing state variable, which depends directly or indirectly on the preloading force, is brought within predetermined tolerances to a state target value, i.e., adjusted into an ideal state target range. As a result, it is possible to obtain high running smoothness, low wear and a stiffness of the bearing arrangement that is as high as possible.

Applying an axial preloading force onto the preloading element can correspond to applying an axial pressing-in force that acts on the preloading element, wherein the acting pressing-in force is counter to the preloading force.

In the first step A), a pre-assembled bearing arrangement is provided, wherein the outer bearing rings and the at least one preloading element are held together with a defined, predetermined start value of the preloading force. Here, the start value is selected in such a way that the preloading force lies at, or below, a threshold required for the operationally ready assembly such that, expressed differently, the axial preloading force produces a loose pre-assembly.

In the next step B), a load moment is exerted onto the gear wheel. By way of example, a load torque can be a breakaway torque, with which the gear wheel has to be driven to rotate about its axis in order to carry out a rotation in the bearing arrangement, or else a tilt or displacement moment, that acts transversely to the axis on the gear wheel. These two operating cases are explained in more detail below.

Subsequently, in step C), a bearing state variable that is correlated with the load moment is measured. Here, it is possible to measure the size of the load moment itself, for example the breakaway torque or tilt moment coupled into the gear wheel, and, as an alternative or in addition thereto, it is also possible to measure a variable that depends on the load moment, such as a displacement of the gearwheel, for example, a tilt in relation to the axis, which is produced by an input coupled load moment, for example an aforementioned tilt moment.

In step D), the measured bearing state variable is compared to a predetermined state target value. The state target value defines a reference value that corresponds to a bearing state that should be observed during the operational state.

Step E) is carried out should the measured bearing state variable deviate from the state target value—within predetermined tolerance ranges. To this end, the axial preloading force is modified in order to move the actual value of the bearing state variable in the direction of the state target value. If the measured bearing state variable reaches the state target value—within predetermined tolerance ranges—, the preloading element is affixed, i.e., supported, in axial preloading position at the bearing housing such that it permanently exerts the set preloading force onto the bearing arrangement. With this, the setting process is complete.

Preferably, the preloading force is exerted on a securing element that is arranged in front of an outer bearing ring. The securing element is moved axially against the outer bearing ring, and pressed thereagainst, in the direction of the preloading force. As the securing element is moved further against the preloading element, the compression thereof is increased, and the preloading force is correspondingly increased. Once the value of the preloading force that was predetermined during the setting process is reached, the securing element is affixed to the bearing housing in the preloading position set in that case.

An advantage of the method according to the invention is that the bearing arrangement can be preloaded in a closed-loop control process, taking account of a bearing state variable that depends on the preloading force.

A possible embodiment of the method comprises the steps of:

B1) applying a breakaway torque as load moment for rotational driving of the gear wheel and measuring the breakaway torque in the process as a correlating bearing state variable, C1) comparing the measured breakaway torque with a predetermined torque target value as a bearing state variable, E1) should the measured breakaway torque as a bearing state variable be smaller than the predetermined torque target value as a state target value: increasing the axial preloading force, F1) should the breakaway torque as a bearing state variable attain the predetermined torque target value as a state target value: affixing the preloading element in an axial preloading position at the bearing housing and completing the setting process.

Consequently, in this embodiment of the method, the breakaway torque corresponds to the load moment, the measured breakaway torque corresponds to the correlated bearing state variable and the torque target value corresponds to the state target value.

In order to carry out the setting, the bearing arrangement comprising the outer bearing rings and the gear wheel, and optionally the rolling bodies arranged therebetween, is arranged in the bearing housing. The gear wheel is driven to rotate. The drive can be implemented by the drive unit of the adjustment drive. Alternatively, in the case of a rotational spindle drive, in which the threaded spindle is connected to the gear wheel for rotation therewith, the drive of the gear wheel can be brought about by an external adjustment drive, which drives the threaded spindle to rotate.

Here, the load moment is the breakaway torque, i.e., the drive moment that has to be applied to rotate the gear wheel in the bearing arrangement. This drive moment can be measured by means of suitable sensors, for example by way of torque sensors, or by way of a motor current of the drive unit or an external adjustment drive.

An axial preloading force is applied to the preloading element during the rotating drive, for example by way of a securing element that axially presses the preloading element against an outer bearing ring. Here, the preloading force is preferably measured by means of suitable force sensors.

Subsequently, the preloading force is increased step-by-step or continuously. As a result, there is an increase in the bearing friction of the bearing arrangement, and the measured breakaway torque, which correlates to the preloading force, likewise increases.

The currently measured breakaway torque, which correlates to an applied preloading force, is compared, either step-by-step or continuously, preferably in an automated manner, to a predetermined torque target value.

If the measured breakaway torque is less than the predetermined torque target value, this means that the bearing play is still too large, or the preload is still too small, and so the required rigidity of the bearing arrangement and play-free running under load conditions during operation are not yet ensured. In this case, the preloading force is increased, and the measured breakaway torque is measured again and compared to the torque target value.

The aforementioned steps are run through until the breakaway torque attains the predetermined torque target value. In the axial position attained in the process, the preloading position, the preloading element is affixed relative to the bearing housing, preferably by a securing element. In the preloading position, the preloading element is supported axially at the bearing housing in such a way in the process that it permanently exerts the set preloading force on the outer bearing ring.

As a result of this, force-controlled or torque-controlled setting of the breakaway torque is realized, wherein the preloading force is regulated by the measured breakaway torque. Automated, precise setting of the breakaway torque is facilitated. The preloading element ensures that the set breakaway torque of the adjustment drive remains substantially constant over the entire service life of the adjustment drive, independently of wear and operating conditions.

As an alternative to, or else in addition or together with, the above-described embodiment, the method according to the invention can provide the following steps:

B2) applying a tilting moment as a load moment across the axis on the gear wheel and measuring a displacement of the gear wheel relative to the bearing housing in the process as a correlating bearing state variable, C2) comparing the measured displacement as a bearing state variable with a predetermined stiffness threshold as a state target value, E2) should the measured displacement as a bearing state variable be greater than a predetermined stiffness threshold as a state target value: increasing the axial preloading force, F2) should the measured displacement as a bearing state variable attain the predetermined stiffness threshold: affixing the preloading element in an axial preloading position at the bearing housing and completing the setting process.

Consequently, in this embodiment of the method, the tilt moment corresponds to the load moment, the measured displacement of the gear wheel relative to the bearing housing corresponds to the correlated bearing state variable and the stiffness threshold corresponds to the state target value.

By applying a tilt moment, the bearing arrangement is subjected to bending in the transverse direction. The lateral deformation occurring in the process is a measure for the stiffness of the bearing arrangement. The stiffness of the bearing arrangement depends on the preloading force, with a high preloading force correlating with a high stiffness.

Like in the above-described embodiments, a start value of the preloading force is initially set. A tilting moment is exerted on the gear wheel as a load moment.

By way of example, the tilt moment can be input coupled by a tilting or bending force that is introduced transversely into the threaded spindle.

The displacement of the gear wheel produced by the tilt moment is measured, for example by way of a radial deflection of the threaded spindle connected to the gear wheel.

The measured displacement is compared to a stiffness threshold. The latter denotes a reference value of the displacement that is correlated to the necessary stiffness.

The required stiffness is not provided for as long as the measured displacement is greater than a predetermined stiffness threshold. In this case, the preloading force is increased until the measured displacement is less than or equal to the stiffness threshold within predetermined tolerance ranges. This realizes travel-controlled setting of the stiffness, wherein the preloading force is regulated by the measured displacement of the gear wheel.

As described above, the preloading force can be set depending on the breakaway torque or tilt moment, or else on the breakaway torque and tilt moment. This allows optimized setting of an adjustment drive, which ensures a stiffness that is as high as possible with an easy adjustability.

The preloading force can be measured when the preloading force is applied. Faults can be detected by comparison with the other measurement variables. By way of example, a deviatingly high breakaway torque in the case of a relatively small preloading force can indicate a defect that can lead to a stiff bearing.

The breakaway torque and/or the tilt moment can be introduced by way of the threaded spindle. The threaded spindle, which is securely connected to the gearwheel in the case of a rotational spindle drive in particular, can be driveable to rotate with an external adjustment drive in order to drive the gearwheel to rotate. As a result of a tilt force being introduced across the axis into the threaded spindle at an axial distance, a tilt moment can be introduced into the gear wheel, both in the case of a plunger spindle drive and in the case of a rotational spindle drive.

Furthermore, the invention relates to a further method for setting a bearing arrangement of an adjustment drive for a steering column that is adjustable by motor for a motor vehicle, comprising a threaded spindle with an axis, said threaded spindle engaging in a spindle nut, and a gear wheel which is connected to the spindle nut or the threaded spindle for rotation therewith and which is rotatably mounted about the axis in a bearing housing in a bearing arrangement between two outer bearing rings that are axially supported at the bearing housing, wherein an outer bearing ring (93) is supported in an axially resilient manner at the bearing housing by way of an elastic preloading element, comprising the steps of:

A) applying an axial preloading force to the preloading element,

B) measuring the axial preloading force,

D) comparing the measured preloading force with a predetermined target preloading force, E) should the measured preloading force deviate from the predetermined target preloading force: modifying the axial preloading force, F) should the measured preloading force attain the predetermined target preloading force: affixing the preloading element in an axial preloading position at the bearing housing and completing the setting process.

Preferably, the target preloading force can comprise a range. Consequently, the target preloading force is embodied as a target preloading range. This range can be established in trials such that the bearing arrangement satisfies the respective requirements in respect of running smoothness, stiffness and breakaway torque in this range.

The preloading force can be exerted on a securing element that is arranged in front of an outer bearing ring. Here, it is advantageous if the securing element is movable relative to the bearing housing in the direction of the preloading force and embodied to affix itself at the bearing housing against the preloading force. As described above, the outer bearing rings and the gear wheel can be arranged coaxially in a hollow cylindrical receiving space of the bearing housing and the securing element is formed by a securing ring, which has barb-like fastening means. Such a self-affixing securing ring can easily be pressed against the bearing arrangement in the preloading direction under the effect of the preloading force. In the assembled state, the preloading force now acting as a result of the spring force of the preloading element acts in the opposite direction on the securing ring, as a result of which the latter clings on or buries itself in the bearing housing in an interlocking manner by way of appropriate cutting edges, and affixes itself independently in its preloading position.

Preferably, the core element lies outside of the power flow between the bearing rings. As a result, a force acting on the bearing rings in the direction of the axis is not introduced into the core element. The bearing rings that support one another form a support device which supports pressure forces acting on the bearing rings outside of the core element and consequently keeps these away from the core element.

Furthermore, an adjustment drive for a steering column that is adjustable by motor for a motor vehicle is proposed for achieving the object, said adjustment drive comprising a threaded spindle with an axis, said threaded spindle engaging in a spindle nut, a drive unit and a gear wheel which is driveable to rotate about the axis by the drive unit and which has a toothing portion, which is arranged axially between two circumferential bearing faces that are coaxial with the axis, wherein the gear wheel is connected to the spindle nut or the threaded spindle for rotation therewith. According to the invention, what is proposed for a generic adjustment drive with the aforementioned features is that the gear wheel has a core element, two bearing rings being connected therewith, said bearing rings each having a bearing face and supporting one another axially.

Preferably, the core element lies outside of the power flow between the bearing rings. As a result, a force acting on the bearing rings in the direction of the axis is not introduced into the core element. The bearing rings that support one another form a support device which supports pressure forces acting on the bearing rings outside of the core element and consequently keeps these away from the core element.

In the gear wheel according to the invention, the bearing rings are connected to a core element at the end side, and so an easy-to-assemble integral component is provided.

Axially, the bearing rings are applied on both sides of the toothing portion and each have a respective bearing face on their outer sides, which face away from the core element and which also form outer sides of the gear wheel. Here, according to the invention, the bearing rings are connected to one another in such a way that a force that is introduced onto the bearing faces in the axial direction is transferred from the one bearing ring to the other bearing ring without the core element being loaded by the force between the bearing rings. Expressed differently, the core element is kept with little load between the bearing rings in the axis direction when an axial force is introduced, for example when applying an axial loading force for setting the bearings without play. Here, the axial power flow between the bearing rings can be established by virtue of the two bearing rings contacting one another and directly supporting one another axially, or it can be established indirectly, wherein a force transmission element may be arranged between the two bearing rings, said force transmission element likewise not transmitting any force onto the core element in the axial direction. In any case, the force transmission in the axial direction is effected, without interposing the core element, via the stiff structure for force transmission or conduction that is formed by the bearing rings, independently of the core element. The two bearing rings can also be embodied as a one-piece integral component.

The bearing faces are arranged between outer bearing faces of a bearing arrangement. In each case, one outer bearing face, which is usually arranged at an outer ring, lies axially opposite a bearing face in this case such that the bearing gap is situated between the outer bearing face and bearing face. As a result of the outer bearing faces being adjusted relative to one another axially, it is possible to set the distance to the bearing faces, and hence the bearing play, and it is possible to apply an axial force in order to brace the bearing faces between the outer bearing faces without play.

The axial forces acting on the bearing rings are transferred in an axial force flow past the core element by way of the mutual support according to the invention. A load exerted axially onto the bearing faces is absorbed by the structure according to the invention between the bearing rings and thereby kept away from the core element. As a result of no material of the core element being situated in the axial force flow, it is not loaded by the forces occurring when the bearing is braced and by the forces occurring during operation.

As a result, the possibility of independently optimizing the materials of the bearing rings and of the core element in view of the properties required during operation arises. Preferably, the bearing rings can consist of a hard material that does not yield to pressure, which facilitates a rigid and loadable axial connection, said connection being suitable for receiving the forces acting on the bearing face, and preferably facilitates an integrated embodiment of plain bearing faces or rolling body raceways. By way of example, steel fulfils these requirements well. By contrast, the core material can consist of a softer material, for example of softer metal alloys, such as brass, for example, or plastics. Plastics, in particular, can be optimized in view of their properties to the respective requirements, for example in respect of elasticity and sliding properties for realizing drives and spindle drives with little play and smooth running. The property of such plastics materials to flow under pressure and to plastically deform is not decisive in the design according to the invention of a gear wheel because potentially damaging forces are received by the bearing rings that are supporting one another and hence an unwanted deformation of the core element arranged between the bearing rings in the axial direction is practically excluded. As a result, a greater design freedom than in the prior art is facilitated in view of the combination of different materials for the bearing rings and the core element.

The bearing rings can be connected fixedly, preferably non-detachably, to the core element, for example by substance-to-substance bonding such as welding or adhesive bonding, or by embedding or insert moulding. As a result, the gear wheel can be provided as an integral, easy-to-assemble component.

The bearing rings are preferably attached to both axial end sides of the core element, wherein the bearing faces, as seen from the core element, are directed axially to the outside, for example as substantially circular-ring-shaped or conical bearing faces. In one bearing arrangement, the bearing faces are in sliding contact, or by ways of rolling bodies in rolling-body contact, with corresponding outer bearing faces that are arranged axially on both sides of the gear wheel. Here, it is possible to realize angular-contact bearings by conical bearing faces, which may also be provided with rolling body raceways that are at an angle to the axis, said angular-contact bearings simultaneously facilitating an optimized radial and axial bearing and support.

Initially, the bearing rings can be provided as two separate components, which are assembled in the gear wheel with the core element such that they are connected to one another directly or indirectly in the axial direction for axial force transmission purposes. The force transmission can be effected in direct contact, or by way of force transmission elements disposed therebetween, although these do not introduce any force into the core element in the axial direction.

Provision can be made for the two bearing rings to be embodied together in integral fashion. Here, both bearing rings are embodied at a one-piece integral bearing ring element. By way of example, such a bearing ring element can have a sleeve-shaped or drum-shaped embodiment, with the bearing faces being situated in the region of the axial end sides. In the axial direction, the bearing faces are continuously connected to one another in integral fashion by way of the bearing ring element. The power flow in the case of an axial load is consequently effected through the continuous material of the bearing ring element. It is likewise conceivable and possible to initially manufacture separate bearing rings and to connect these to one another to form a bearing ring element in a further step, before the connection to the core element is effected.

The gear wheel can be mounted in rolling-element bearings, wherein the bearing faces of the bearing rings have rolling body raceways, preferably ball-bearing raceways. The axially opposing outer bearing faces that are assigned to the bearing rings likewise have corresponding ball-bearing raceways, and ball bearings as rolling bodies are arranged so as to be able to roll between the ball-bearing raceways. In this embodiment, the bearing rings form inner rings of rolling-element bearings, preferably with bearing faces or ball-bearing raceways lying at an angle to the axis such that angular-contact ball bearings are formed, which facilitate the reception of bearing loads in the axial and radial direction in the case of the compact design. Preferably, the bearing faces are embodied in such a way that the gear wheel is mounted in the housing by means of an X-bearing.

The bearing rings and the outer bearing faces can also have sliding faces that slide on one another such that a plain bearing arrangement is formed.

It is possible that the bearing rings are embodied as sheet metal shaped parts, preferably from sheet steel. Such sheet metal shaped parts can be manufactured efficiently as press/punch parts with the demanded properties. Individual bearing rings can be made available as bushings, which each have a bearing face and which, according to the invention, are connected to one another and to the core element. Both bearing rings also can be arranged at a single bearing ring element, which can be produced by connecting two bearing rings or which can be manufactured as an integral sheet metal shaped part from a single sheet metal portion. The sheet metal shaped part can have integrally formed raceways for rolling bodies, preferably ball-bearing raceways, that can be embodied to be sufficiently hard, for example also by means of continuous or partial hardening or hard coating. The raceways are connected by integrally continuous sheet metal portions.

Alternatively, it is likewise conceivable and possible for the bearing rings to be embodied as a cold extrusion part or as a selective laser melting component.

An advantageous embodiment provides for the toothing portion and/or the spindle nut and/or a connecting piece to have an integral one-piece embodiment with the core element. The core element can be manufactured from materials which, on account of their material properties, are well suited to the use as gear elements. By way of example, plastics are well suited for providing smooth running and low-wear toothings and screw drives. According to the invention, the toothing can be moulded into the core element consisting of plastics for the drive engagement with the drive unit and—in the case of a plunger spindle drive with a spindle nut that is driveable to rotate—the female thread of the spindle nut can be moulded into the core element consisting of plastics. In the case of a rotation spindle drive, the core element likewise can comprise a toothing that is integrally moulded into plastics, and a connecting piece for connecting the gear wheel to the threaded spindle for rotation therewith.

It is advantageous for the core element to be embodied as a plastics injection moulded part. Manufacturing by way of the injection moulding method from thermoplastic plastics, for example polypropylene (PP), polyoxymethylene (POM) or the like, is efficient and facilitates flexible shaping, also in view of the embodiment of the toothing or the female thread. Optionally, the plastics can be provided with a reinforcement, for example by the addition of reinforcement fibres, in order to increase the strength, Manufacturing the core element as a plastics injection moulding part facilitates a particularly advantageous connection to the bearing rings by virtue of the core element being moulded onto the bearing rings. Here, the bearing rings are arranged in the cavity of an injection moulding tool and at least partly surrounded by the molten liquid plastics injected therein such that, after cooling, they are substance-to-substance bonded to the plastics of the core element. A particularly secure connection can be reached by virtue of the bearing rings having interlock elements that are substance-to-substance bonded and connected in an interlocking fashion to the core element. By way of example, the interlock elements can have perforations and/or projections and/or a knurling of the bearing ring or rings, which are penetrated by the plastics material, and embedded in the latter, when injection moulding the core element. After cooling, this results in the bearing rings, or a bearing ring element comprising both bearing rings, being anchored in a non-detachably secured manner by an interlocking connection and substance-to-substance bond in the core element by way of the interlock elements. As a result, the toothing, the female thread and/or a connecting piece can be connected to the bearing rings securely and positionally accurately in the long-term. Even in the case of a core element that is not manufactured as an injection moulded part, the interlock elements can serve to produce an interlocking connection between the core element and one or both bearing rings.

In an adjustment drive according to the invention, the bearing rings can be braced between corresponding outer bearing rings of a bearing arrangement. Between the outer bearing rings, the gear wheel is rotatably mounted by way of the bearing faces of the bearing rings. In order to set and minimize the bearing play, the outer bearing rings can be moved against one another, and hence against the respectively corresponding bearing rings, in the axial direction and can be pressed on with a preloading force. The preloading force can be produced by elastic preloading elements, which are supported at a secure counter bearing, for example a bearing housing in the axial direction. Depending on the embodiment of the steering column, the counter bearing can be securely attached in the axial direction to the actuating unit, the carrying unit or a casing unit connected to the carrying unit. Such a preloading element can comprise a spring element, for example a disc spring or wave spring, or else an elastomeric element in the form of a rubber ring or the like.

Figure 2:
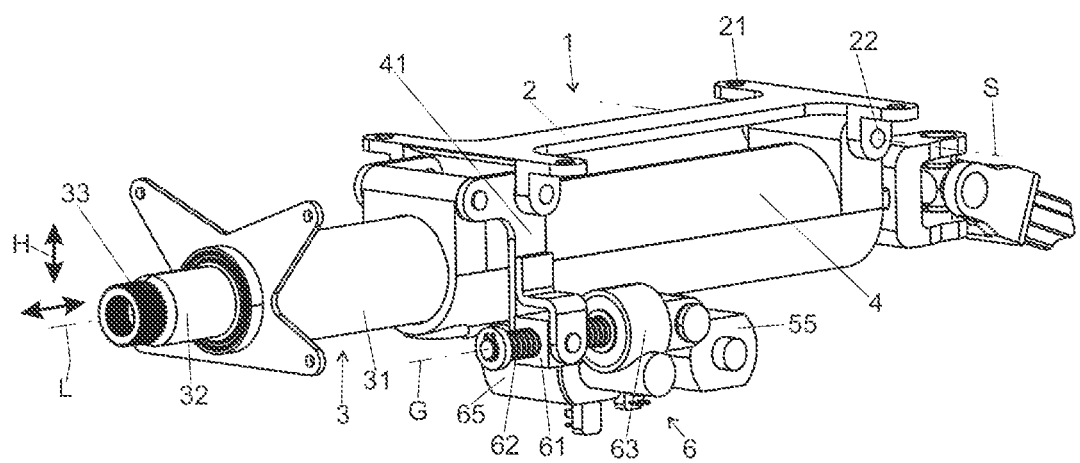
FIG. 2 is a further perspective view of the steering column as per FIG. 1, from a different viewing angle.

FIG. 1 shows, from obliquely top right, a steering column 1 according to the invention in a schematic perspective view of the rear end in relation to the direction of travel of a vehicle (not illustrated here), where the steering wheel (not illustrated here) is held in the operating region. FIG. 2 shows a steering column 1 in a view from the opposite side, i.e., as seen from top right.

The steering column 1 comprising a carrying unit 2, which is embodied as a console that comprises fastening means 21 in the form of fastening bores for attachment to a vehicle body (not illustrated here). The carrying unit 2 holds an actuating unit 3, which is received in a casing unit 4—which is also referred to as a guide box or box-section swinging fork.

The actuating unit 3 has a steering column tube 31, in which a steering spindle 32 is mounted to be rotatable about a longitudinal axis L, said steering spindle extending axially in the longitudinal direction, i.e., in the direction of the longitudinal axis L. Formed at the rear end of the steering spindle 32 is a fastening portion 33, a steering wheel (not illustrated here) being attachable thereon.

In order to realize a longitudinal adjustment, the actuating unit 3 is received in the casing unit 4 so as to be telescopically displaceable in the direction of the longitudinal axis L in order to be able to position the steering wheel that is connected to the steering spindle 32 forward and backward in the longitudinal direction relative to the carrying unit 2, as indicated by the double-headed arrow parallel to the longitudinal axis L.

The casing unit 4 is mounted in a pivot bearing 22 at the carrying unit 2 in a manner to be pivotable about a horizontal pivot axis S that is transverse to the longitudinal axis L. In the rear region, the casing unit 4 is connected to the carrying unit 2 via an actuating lever 41. As a result of a rotational movement of the actuating lever 41 by means of an illustrated actuating drive 6 (see FIG. 2), the casing unit 4 can be pivoted relative to the carrying unit 2 about the pivot axis S that lies horizontally in the installed state, as a result of which it is possible to adjust a steering wheel, attached to the fastening portion 33, in the height direction H, as indicated by the double-headed arrow.

A first adjustment drive 5 for adjusting the longitudinal position of the actuating unit 3 relative to the casing unit 4 in the direction of the longitudinal axis L comprises a spindle drive with a spindle nut 51 with a female thread 74 extending along an axis G, a threaded spindle 52 engaging therein; i.e., the male thread of said threaded spindle is screwed into the corresponding female thread 74 of the spindle nut 51. The threaded spindle axis of the threaded spindle 52 is identical to the axis G and extends substantially parallel to the longitudinal axis L.

The spindle nut 51 is mounted in a bearing housing 53 so as to be rotatable about the axis G, said bearing housing being securely connected to the casing unit 4. In the direction of the axis G, the spindle nut 51 is axially supported at the casing unit 4 via the bearing housing 53, as will still be explained in more detail below.

With a fastening element 54 embodied at the rear end thereof, the threaded spindle 52 is connected to the actuating unit 3 via a transmission element 34, to be precise in a manner fixed in the direction of the axis G or the longitudinal axis L and stationary in respect of rotation about the axis G. As a result of the spindle nut 51 that is driveable to rotate and the threaded spindle 52 that is stationary in respect of rotation, a so-called plunger spindle drive is realized.

The transmission element 34 extends from the actuating unit 3 through a slot-shaped passage opening 42 in the casing unit 4. In order to adjust the steering column 1 in the longitudinal direction, the transmission element 34 can be moved freely along in the passage opening 42 in the longitudinal direction.

The adjustment drive 5 has an electric servomotor 55, by means of which the spindle nut 51 is driveable to rotate in respect of the axis G relative to the stationary threaded spindle 52. As a result, it is possible—depending on the direction of rotation of the servomotor 55—to displace the threaded spindle 52 in the direction of the axis G in translational fashion relative to the spindle nut 51 such that, accordingly, the actuating device 3 connected to the threaded spindle 52 is adjusted in the direction of the longitudinal axis L relative to the casing unit 4 connected to the spindle nut 51. The drive of the spindle nut 51 and the support of the spindle nut 51 in the direction of the axis G at the casing unit 4 will still be explained in detail further down.

In FIG. 2, which shows a perspective view of the steering column 1 from the side lying at the back in FIG. 1, it is possible to recognize how a second adjustment drive 6 for adjusting the height direction H is attached to the steering column 1. This adjustment drive 6 comprises a spindle nut 61, in the female thread 74 of which a threaded spindle 62 engages along an axis G. The threaded spindle 62 is mounted so as to rotatable about the axis G in a bearing housing 63, which is fastened at the casing unit 4, axially supported, in the direction of the axis G, at the casing unit 4 and driveable, optionally in both directions of rotation, by an electric servomotor 65 so as to be rotatable about the axis G. This will still be explained in detail further down.

The spindle nut 61 is attached in a stationary manner in respect of a rotation about the axis G at one end of the two-arm actuating lever 41, which is mounted at the carrying unit 22 so as to be are rotatable about a pivot bearing 23, the other arm of said actuating lever being connected, with the other end thereof, to the casing unit 4.

By rotating the threaded spindle 61, it is possible—depending on the direction of rotation of the servomotor 65—to displace the spindle nut 61 in translational fashion relative to the threaded spindle 62 in the direction of the axis G such that, accordingly, the casing unit 4, which is connected to the spindle nut 41 via the actuating lever 41, together with the adjusting device 3 received therein can be adjusted up or down in the height direction H relative to the carrying unit 2, as indicated by the double-headed arrow. The drive of the threaded spindle 62 and the support of the threaded spindle 62 in the direction of the axis G at the casing unit 4 will still be explained in detail below.

Figure 3:
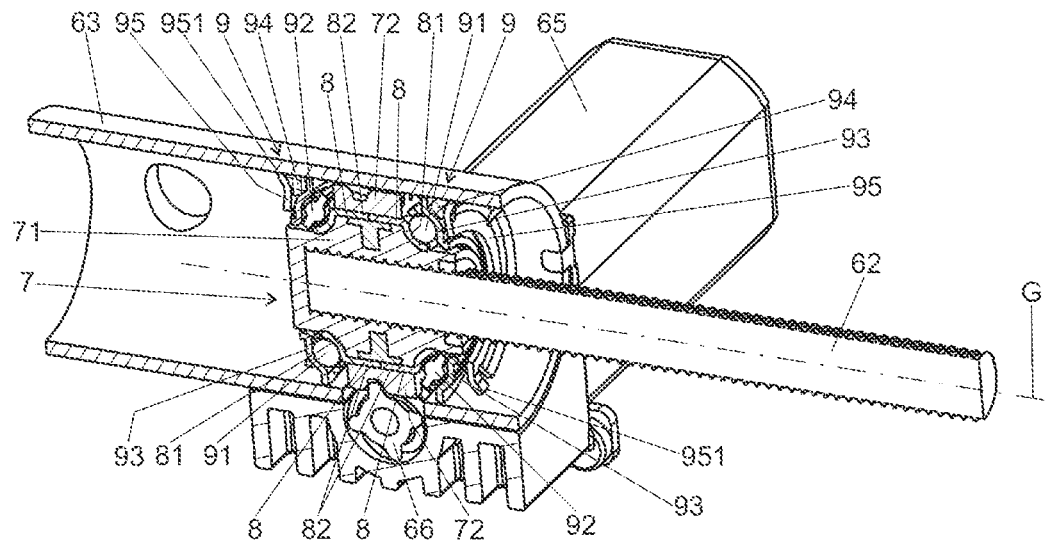
FIG. 3 is a longitudinal section in a perspective view along the threaded spindle axis through an adjustment device of a steering column as per FIGS. 1 and 2.
Figure 4:
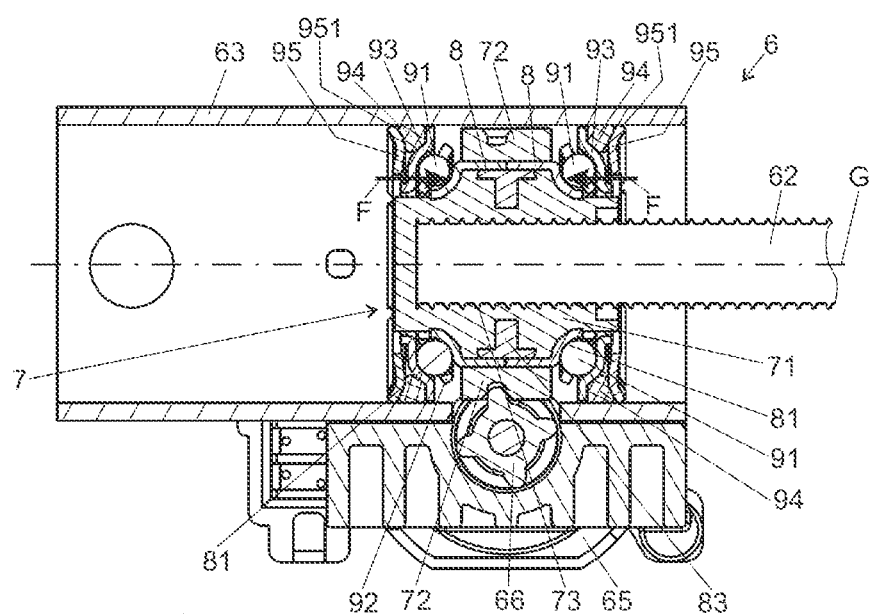
FIG. 4 is a longitudinal section in a side view as in FIG. 3.

FIG. 3 and FIG. 4 present a longitudinal section through the bearing housing 63 of the adjustment drive 6 along the axis G in different views.

A gear wheel 7 designed according to the invention is fastened to the threaded spindle 62 for rotation therewith in respect of the axis G. The gearwheel 7 has a core element 71 made out of plastics, which is preferably produced from a thermoplastic such as PP, POM or the like as a plastics injection moulded part. At its outer circumference, the gearwheel 7 comprises at the core element 71 a circumferential toothing 72 that is coaxial to the axis G, said toothing being embodied as a worm toothing in the illustrated example such that the gearwheel 7 forms a worm wheel. A worm 66 that is driveable to rotate by the servomotor 65 engages in the toothing 72.

In the region of a central connecting portion 73, which forms a connecting piece, the core element 71 is connected to the threaded spindle 62 for rotation therewith. By way of example, the connection can be embodied as a substance-to-substance bond by virtue of the core element 71 being moulded onto the threaded spindle 62 in the process of injection moulding to the threaded spindle 62. In addition or as an alternative thereto, an interlocking and/or any other type of fastening may be provided.

Bearing rings 8 of the gear wheel 7 are fixedly connected to the core element 71. Each bearing ring 8 has a ring-shaped bearing face 81 that is coaxial to the axis G and embodied as the ball-bearing raceway. As seen from the core element 71, the two bearing faces 81 run to the outside, in an end-side conical manner. Expressed differently, the ball-bearing raceways are at an angle to the axis G.

Axially, the bearing rings 8 comprise support portions 82 that are directed against one another in the direction of the axis G, said support portions directly lying against one another in the shown example such that the bearing rings 8 are directly supported against one another in the direction of the axis G. In particular, no plastics material of the core element 71 is situated between the support portions 82 of the bearing rings 8 that are in contact with one another.

The bearing rings 8 are preferably embodied as sheet metal shaped parts, particularly preferably as press/punch parts made of sheet steel. For the purposes of connection to the gear wheel 7, the plastics of the core element 71 is injection moulded onto the bearing rings 8 and the latter is thus embedded into the core material 71 in a substance-to-substance bonded and interlocking manner, apart from the bearing faces 81 that are exposed to the outside on the end side. Optionally, provision can be made of a fixing element 83, at which the two bearing rings 8 are positioned relative to one another and held during the insert moulding with plastics such that they lie against one another axially in the direction of the axis G. However, the fixing element 83 can also be omitted. Alternatively, it is also conceivable to directly connect the bearing rings 8 prior to insert moulding, for example by point welding or the like.

The bearing faces 81 from the inner rings of a rolling-element bearing arrangement 9, which comprises ball bearings 91 that are held in a rotatable manner in a ball-bearing cage 92 and that are arranged so is to roll in the axial bearing gap between said ball-bearing raceways of the bearing faces 81 and corresponding ball-bearing raceways in outer bearing rings 93. As seen from the gear wheel 7, the outer bearing rings 93 are supported axially to the outside on both end sides by way of elastic spring elements 94, which form preloading elements, elastomeric rubber rings in the shown example, against axial counter bearings in the form of securing rings 95, which in turn are connected in a manner stationary in the axial direction of the axis G to the bearing housing 53, for example by wedging, caulking or jamming. The spring element 94 likewise can be embodied as a wave spring or disk spring.

In the embodiment illustrated in FIG. 4, spring elements 94 that are embodied as preloading elements are arranged in both end sides of the gear wheel 7, said spring elements being supported axially at the bearing housing 63 by the two securing rings 94 and being elastically braced axially. Here, the spring force acts as a preloading force F on the bearing faces 81 via the outer bearing rings 93 and the ball bearings 91, and so the gearwheel 7 is preloaded between the rolling element bearing arrangements 9 axially.

For affixing purposes, the securing rings 95 can have at their outer circumference fastening means 951, for example partly or completely circumferential cutting edges that protrude to the outside and that bury themselves in an interlocking plastic manner into the inner wall of the bearing housing 63. Preferably, the cutting edges are inclined against the axis G such that the fastening means 951 have a barb-like embodiment. As a result, the securing rings 95 can be moved axially only in the direction against the gear wheel 7 in the bearing housing 63. As a result of the preloading force F that acts in the assembled state, the securing rings 95 are loaded oppositely, as a result of which the fastening means 951 cling to the inner wall of the bearing housing 63 as a result of their barb-like embodiment. Expressed differently, the securing rings 95 have a self-affixing embodiment.

An axial preloading force F is applied during the assembly of the rolling-element bearing arrangement 9 for the purposes of avoiding bearing play in the direction of the axis G. It is applied by the securing rings 95, the spring elements 94 embodied as preloading elements and the ball bearings 91 on the bearing faces 81 of the bearing rings 8 on the bearing rings 8, as indicated by force arrows in FIG. 4. The preloading force F is maintained during the entire service life by the elastic spring elements 94 that act as preloading elements. As a result, the two bearing rings 8 are pressed against one another axially, wherein the force F acting on the bearing faces 81 during operation is transmitted completely in the power flow through the bearing rings 8. What is advantageous here, in particular, is that the plastics material of the core element 71 is not situated in the power flow between the bearing rings 8, i.e., it is not subjected to pressure. This unloading ensures that the plastics material is not plastically deformed by flowing.

Figure 5:
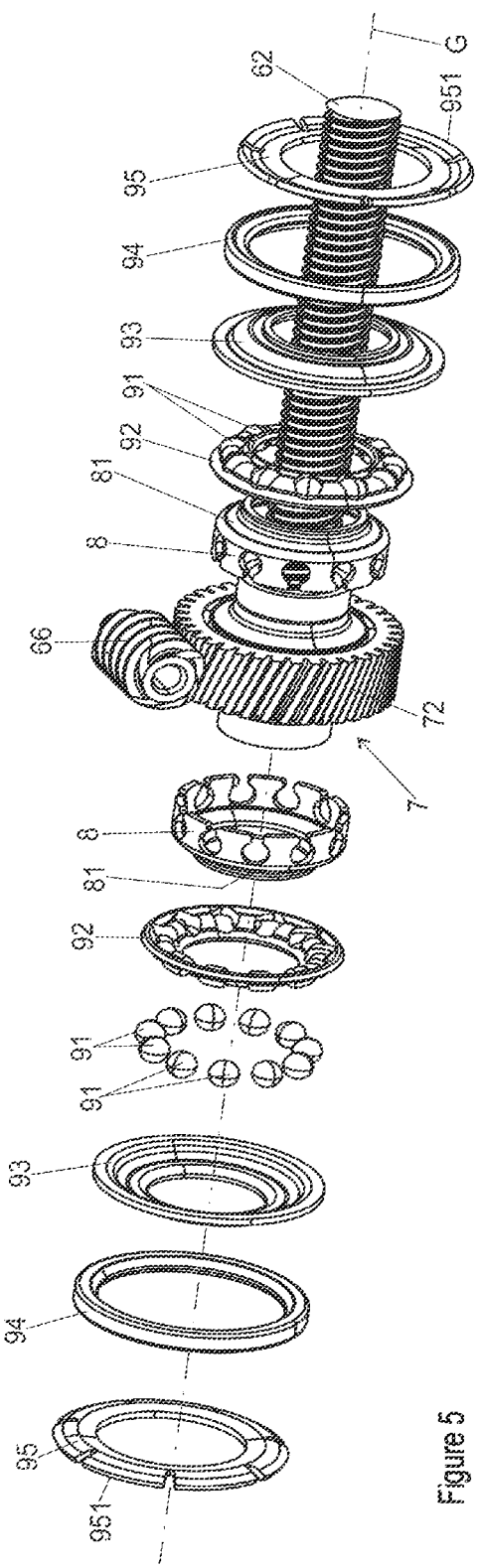
FIG. 5 is an exploded view of the spindle drive as per FIGS. 3 and 4.

FIG. 5 shows the individual parts of the gear wheel 7 and of the rolling-element bearing arrangement 9 pulled apart in an exploded illustration in the direction of the axis G.

Figure 6:
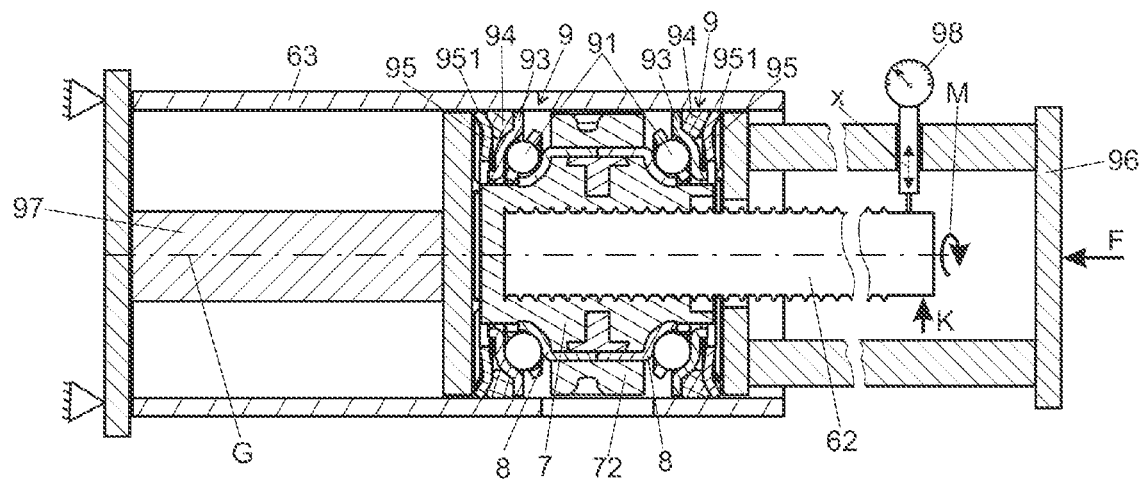
FIG. 6 is a longitudinal section through the bearing arrangement of a spindle drive as in FIG. 4 when setting the bearing arrangement.

FIG. 6 shows an adjustment drive 6 during setting in a setting device, which comprises an axially movable compression column 96 and a counter bearing 97 that is stationary relative thereto. By means of a source of force (not illustrated here), the compression column 96 can have applied a preloading force F thereto, the latter consequently serving as pressing-in force.

In order to set the rolling-element bearing arrangements 9, the one securing element 95, which lies to the left in FIG. 6, is axially supported at the counter bearing 97 while the other securing ring 95, situated at the right in the drawing, is pressed against the gear wheel 7 in the axial direction with the preloading force F by way of the compression column 96. Here, the securing ring 95 is initially displaced as far as against the spring element 94 by way of the above-described barb-shaped embodiment of the fastening means 951. Upon contact, the spring element 94 is axially compressed by the preloading force F and the preloading force F is introduced into the rolling-element bearing arrangement.

The magnitude of the preloading force F with which the gear wheel 7 is preloaded in the rolling-element bearing arrangement 9 can be effected depending on a breakaway torque M that has to be applied to turn the gear wheel 7. To this end, the gear wheel 7 is driven to rotate, for example by the servomotor 66 of the drive unit. Alternatively, as per FIG. 3, 4, 6, 7 or 8, in the case of a rotational spindle drive, in which the threaded spindle 62 is connected to the gear wheel 7 for rotation therewith, the drive can be brought about by an external adjustment drive (not illustrated here), which drives the threaded spindle 62 to rotate.

The breakaway torque M can be measured by means of suitable sensors, for example by way of torque sensors, or by way of a motor current of the servomotor 65 or an external adjustment drive.

During the rotating drive, the axial preloading force F is applied by the compression column 96 on the bearing arrangement proceeding from a predetermined start value and said preloading force is increased continuously or step-by-step and preferably measured by means of suitable force sensors in the process. As a result, there is an increase in the bearing friction, and the measured breakaway torque M, which correlates to the preloading force F, likewise increases.

The measured breakaway torque M is compared, preferably automatically, to a predetermined torque target value.

If the measured breakaway torque M is less than the predetermined torque target value, this means that the bearing play is still too large, or the preload is still too small, and so the required rigidity of the bearing arrangement and play-free running under load conditions during operation are not yet ensured. In this case, the preloading force F is increased, and the measured breakaway torque M is measured again and compared to the torque target value.

The aforementioned steps are run through until the measured breakaway torque M as bearing state variable attains the predetermined torque target value as state target value. In the axial position attained in the process, in the preloading position, the securing ring 95 and hence the spring element 94 are affixed relative to the bearing housing 63. The axial affixment can be effected by virtue of the barb-shaped fastening means 951 being buried in the inner wall of the bearing housing 63 in an interlocking plastic manner as a result of the preloading force F exerted by the spring element 94 and then securing this in the preloaded position during unloading or retraction of the compression column 96. As an alternative or in addition thereto, an affixment can be brought about by substance-to-substance bonding, for example welding or the like, or by means of additionally inserted fastening means.

As an alternative or in addition thereto, the preload can be set depending on the bending stiffness of the adjustment drive 6. To this end, the bearing arrangement is subjected to bending by a tilt moment K, which is introduced transversely into the threaded spindle 62. The radial deflection x occurring in the process, which is measured by means of a path measuring device 99, is a measure for the stiffness. It is dependent on the preloading force F, with a high preloading force F correlating with a low deflection x and, accordingly, a high stiffness The deflection x, which serves as a correlating bearing state variable, corresponds to a displacement of the gear wheel 7, for example a tilt in the bearing housing 63, which is produced by the tilt moment that serves as load moment. The measured deflection x is compared to a reference value of a maximum admissible displacement that is assigned to a stiffness threshold corresponding to the state target value.

The required stiffness is not provided for as long as the measured deflection x is greater than a predetermined stiffness threshold. In this case, the preloading force F is increased until the measured deflection x is less than or equal to the stiffness threshold within predetermined tolerance ranges.

Setting the preload can be effected by regulating the breakaway torque M or the tilt moment K, or else by taking account of both load moments M and K.

Alternatively, the preload can be set by regulating the applied and measured preloading force; if the latter attains a predetermined threshold, the so-called target preloading force, the preloading element is affixed and setting the preloading force is completed.

Figure 7:
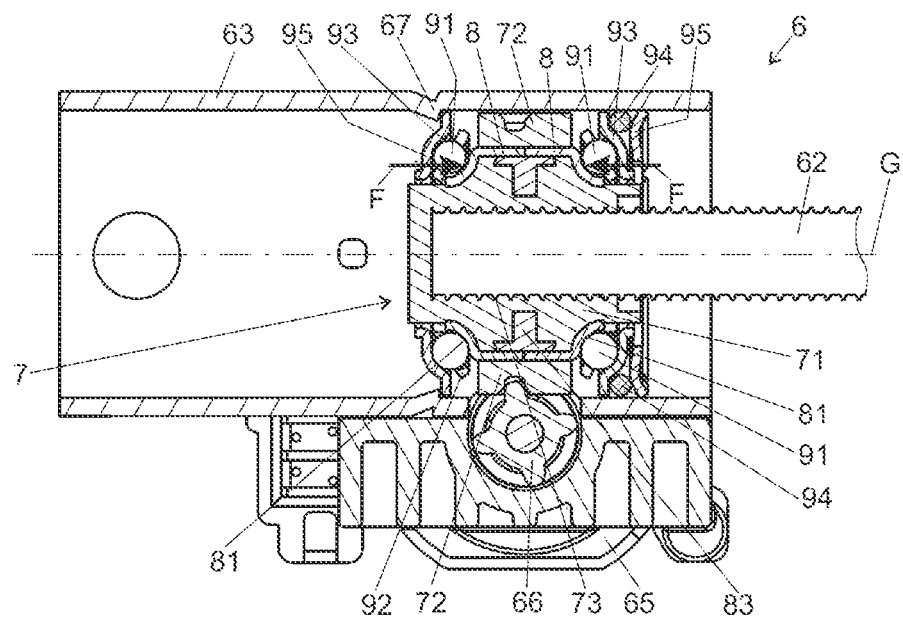
FIG. 7 is a view of a second embodiment of an adjustment device as in FIG. 4.

FIG. 7 shows a second embodiment in which the outer bearing ring 93 lying to the left in the drawing is axially supported against an axial counter bearing 67 that is formed by a moulding of the bearing housing 63 embodied as a shoulder, instead of the one securing ring 95. Moreover, this embodiment has only one spring element 94, which is embodied as an O-ring made of rubber-elastic material, said spring element being arranged to the right in the drawing between the outer bearing ring 93 and the securing ring 95.

Figure 8:
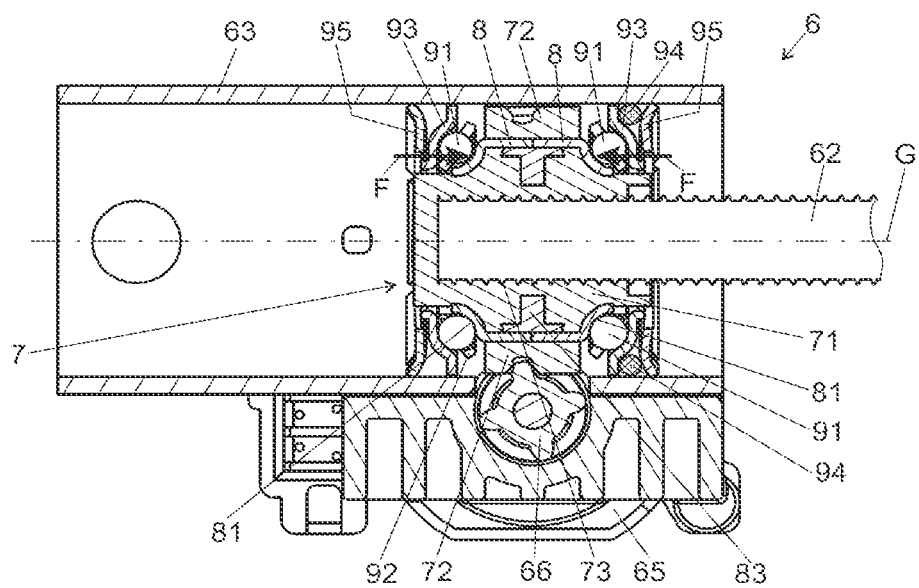
FIG. 8 is a view in a third embodiment of an adjustment device as in FIG. 4.

FIG. 8 shows a third embodiment which has two securing rings 95, like the embodiment as per FIG. 6, but only one spring element 94, which is embodied as an O-ring or similar elastic element, like in FIG. 7.

Figure 9:
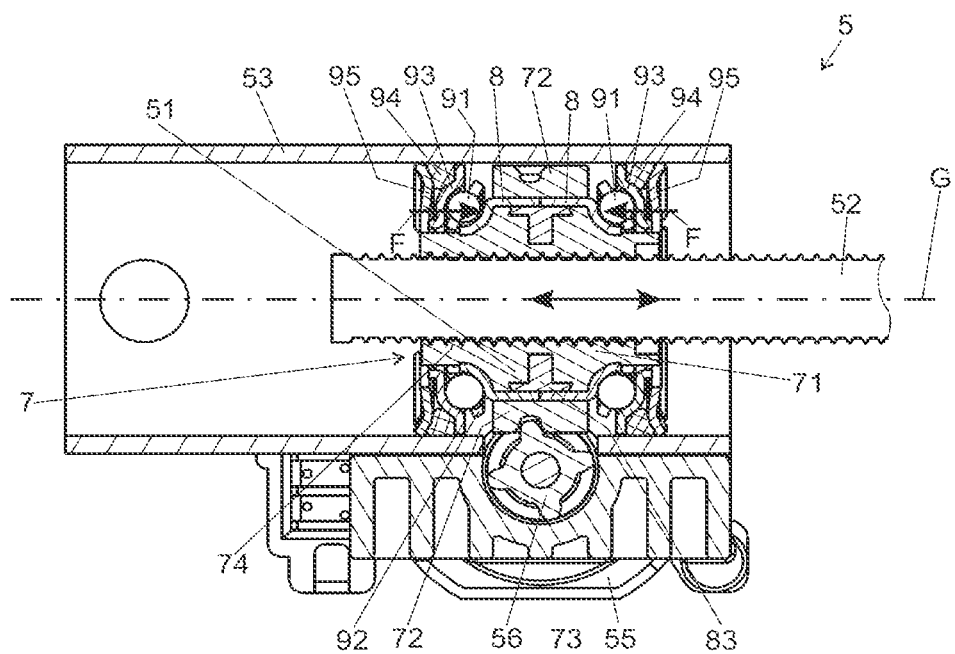
FIG. 9 is a view in a fourth embodiment of an adjustment device as in FIG. 4.

In respect of the bearing of the gearwheel 7, the fourth embodiment as per FIG. 9 has a similar design, in principle, as the embodiment presented in FIGS. 4 and 6. However, in contrast thereto, this is a plunger spindle drive, in which the threaded spindle 62 engages in a thread in the spindle nut 61 that is connected to the gearwheel 7, i.e., it is not connected to the gearwheel 7 for rotation therewith.

Figure 10:
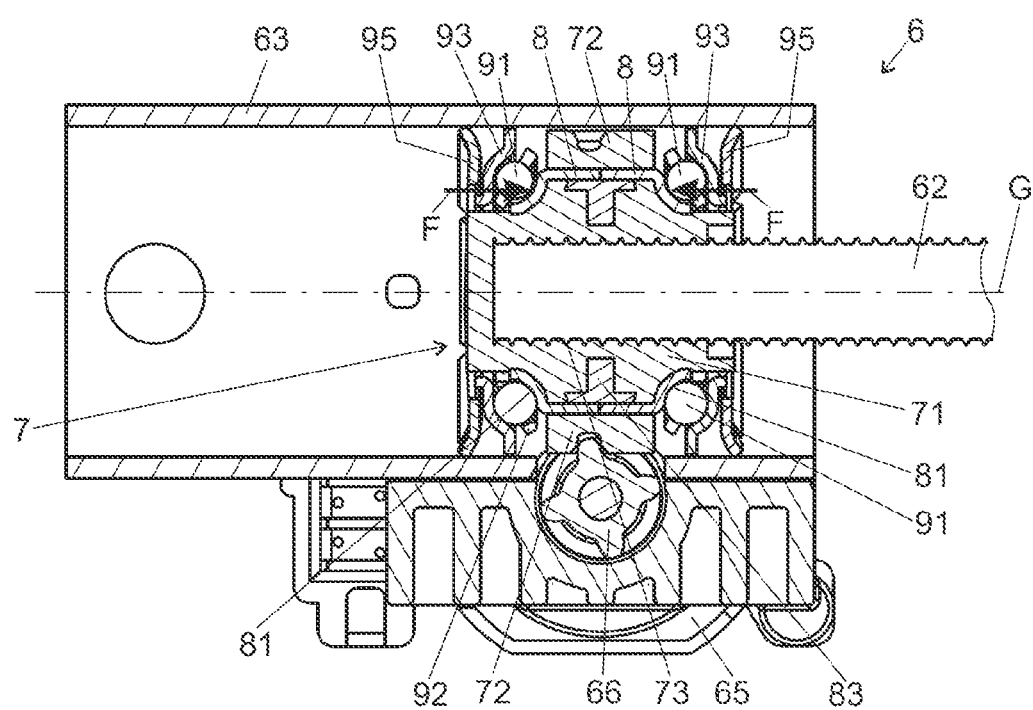
FIG. 10 is a view in a fifth embodiment of an adjustment device as in FIG. 4.

The fifth embodiment as per FIG. 10 is distinguished by virtue of at least one of the securing rings 95, or else both securing rings 95, inherently having an axial spring-elastic embodiment. As it were, the preloading element according to the invention has an integrated embodiment in at least one securing ring 95.

The embodiments shown in FIGS. 7, 8, 9 and 10 can be set as described in relation to FIG. 6.

What is claimed is:

1. An adjustment drive for a steering column that is adjustable by motor for a motor vehicle, comprising:
    a spindle nut,
    a threaded spindle with an axis, said threaded spindle engaging in the spindle nut,
    a drive unit, and
    a gear wheel connected to the spindle nut or the threaded spindle for rotation therewith, the gear wheel configured to be rotated about the axis by the drive unit and which is rotatably mounted about the axis in a bearing housing in a bearing arrangement between two outer bearing rings that are axially supported at the bearing housing,
    wherein the bearing housing has a tube shape,
    wherein the outer bearing rings each have, on their sides facing one another, a circumferential outer bearing face that is coaxial to the axis, each said outer bearing face positioned opposite a bearing face formed on the end side at the gear wheel, wherein at least one of the outer bearing rings is supported in an axially resilient manner at the bearing housing by way of an elastic preloading element configured to exert a preloading force that axially biases the two outer bearing rings against one another, wherein the preloading element comprises a ring-shaped spring element.

2. An adjustment drive for a steering column that is adjustable by motor for a motor vehicle, comprising:
    a spindle nut,
    a threaded spindle with an axis, said threaded spindle engaging in the spindle nut,
    a drive unit, and
    a gear wheel connected to the spindle nut or the threaded spindle for rotation therewith, the gear wheel configured to be rotated about the axis by the drive unit and which is rotatably mounted about the axis in a bearing housing in a bearing arrangement between two outer bearing rings that are axially supported at the bearing housing,
    wherein the bearing housing has a tube shape,
    wherein the outer bearing rings each have, on their sides facing one another, a circumferential outer bearing face that is coaxial to the axis, each said outer bearing face positioned opposite a bearing face formed on the end side at the gear wheel, wherein at least one of the outer bearing rings is supported in an axially resilient manner at the bearing housing by way of an elastic preloading element configured to exert a preloading force that axially biases the two outer bearing rings against one another, wherein the preloading element is supported at a securing element that is connected to the bearing housing.

3. An adjustment drive for a steering column that is adjustable by motor for a motor vehicle, comprising:
    a spindle nut,
    a threaded spindle with an axis, said threaded spindle engaging in the spindle nut,
    a drive unit, and a gear wheel connected to the spindle nut or the threaded spindle for rotation therewith, the gear wheel configured to be rotated about the axis by the drive unit and which is rotatably mounted about the axis in a bearing housing in a bearing arrangement between two outer bearing rings that are axially supported at the bearing housing, wherein the bearing housing has a tube shape, wherein the outer bearing rings each have, on their sides facing one another, a circumferential outer bearing face that is coaxial to the axis, each said outer bearing face positioned opposite a bearing face formed on the end side at the gear wheel, wherein at least one of the outer bearing rings is supported in an axially resilient manner at the bearing housing by way of an elastic preloading element configured to exert a preloading force that axially biases the two outer bearing rings against one another, wherein the preloading element comprises a securing element.

4. The adjustment drive of claim 3 wherein the securing element comprises fastening means for affixment inside the receiving space.

5. An adjustment drive for a steering column that is adjustable by motor for a motor vehicle, comprising:

a spindle nut, a threaded spindle with an axis, said threaded spindle engaging in the spindle nut, a drive unit, and a gear wheel connected to the spindle nut or the threaded spindle for rotation therewith, the gear wheel configured to be rotated about the axis by the drive unit and which is rotatably mounted about the axis in a bearing housing in a bearing arrangement between two outer bearing rings that are axially supported at the bearing housing, wherein the bearing housing has a tube shape, wherein the outer bearing rings each have, on their sides facing one another, a circumferential outer bearing face that is coaxial to the axis, each said outer bearing face positioned opposite a bearing face formed on the end side at the gear wheel, wherein at least one of the outer bearing rings is supported in an axially resilient manner at the bearing housing by way of an elastic preloading element configured to exert a preloading force that axially biases the two outer bearing rings against one another, wherein the preloading element is an integral securing element.

\* \* \* \* \*